(12) United States Patent
Ma et al.

(10) Patent No.: US 11,989,962 B2
(45) Date of Patent: May 21, 2024

(54) METHOD, APPARATUS, DEVICE, STORAGE MEDIUM AND PROGRAM PRODUCT OF PERFORMING TEXT MATCHING

(71) Applicant: Beijing Baidu Netcom Science Technology Co., Ltd., Beijing (CN)

(72) Inventors: Chao Ma, Beijing (CN); Jingshuai Zhang, Beijing (CN); Qifan Huang, Beijing (CN); Kaichun Yao, Beijing (CN); Peng Wang, Beijing (CN); Hengshu Zhu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 363 days.

(21) Appl. No.: 17/559,643

(22) Filed: Dec. 22, 2021

(65) Prior Publication Data
US 2022/0114822 A1 Apr. 14, 2022

(30) Foreign Application Priority Data
Mar. 16, 2021 (CN) .......................... 202110282699.5

(51) Int. Cl.
*G06V 30/00* (2022.01)
*G06V 30/148* (2022.01)
(Continued)

(52) U.S. Cl.
CPC ...... *G06V 30/153* (2022.01); *G06V 30/18181* (2022.01); *G06V 30/274* (2022.01); *G06V 30/41* (2022.01)

(58) Field of Classification Search
CPC ...................... G06V 30/153; G06V 30/18181
See application file for complete search history.

(56) References Cited

U.S. PATENT DOCUMENTS

| 11,238,381 B2 | 2/2022 | Qin et al. |
| 2007/0094219 A1 | 4/2007 | Kipersztok |
| | | (Continued) |

FOREIGN PATENT DOCUMENTS

| CN | 108763196 A | 11/2018 |
| CN | 109189925 A | 1/2019 |
| | (Continued) | |

OTHER PUBLICATIONS

Official Communication issued in corresponding Chinese Patent Application No. 202110282699.5, dated May 17, 2023.
(Continued)

*Primary Examiner* — Ibrahim Siddo
(74) *Attorney, Agent, or Firm* — Keating & Bennett, LLP

(57) ABSTRACT

A method, an apparatus, a device, a storage medium and a program product of performing a text matching are provided, which relate to a field of a computer technology, and in particular to natural language processing and deep learning technologies. The method includes: determining a word set and a plurality of semantic units from a text set, the word set is associated with a first predetermined attribute, and the text set contains a plurality of first texts indicating an object information and a plurality of second texts indicating an object demand information; generating a graph; and generating a final feature representation associated with the text set and the word set based on the graph and a graph convolution model, so as to perform the text matching.

20 Claims, 8 Drawing Sheets

(51) Int. Cl.
*G06V 30/18* (2022.01)
*G06V 30/262* (2022.01)
*G06V 30/41* (2022.01)

(56) References Cited

U.S. PATENT DOCUMENTS

| | | | |
|---|---|---|---|
| 2009/0319518 A1 | 12/2009 | Koudas et al. | |
| 2014/0294302 A1* | 10/2014 | King | G06F 16/41 382/177 |
| 2016/0350283 A1 | 12/2016 | Carus et al. | |
| 2019/0317966 A1* | 10/2019 | Qin | G06F 40/30 |

FOREIGN PATENT DOCUMENTS

| | | |
|---|---|---|
| CN | 109918663 A | 6/2019 |
| CN | 110378544 A | 10/2019 |
| CN | 111428488 A | 7/2020 |
| CN | 112037818 A | 12/2020 |

OTHER PUBLICATIONS

Zhang et al., "Research on Text Similarity Calculation Method Based on Weighted Semantic Web", Journal Chifeng University (Natural Science Edition), vol. 35, No. 5, May 25, 2019, 6 pages.
Zhao et al., "Data-Oreiented Method of Schema Matching Utilizing Information Theory", Journal of Frontiers of Computer Science and Technology, Jul. 3, 2013, 12 pages.
Bravo-Marquez et al., "Building a Twitter Opinion Lexicon from Automatically-annotated Tweets", Knowledge-Based Systems, May 10, 2016, 24 pages.

* cited by examiner

METHOD, APPARATUS, DEVICE, STORAGE MEDIUM AND PROGRAM PRODUCT OF PERFORMING TEXT MATCHING

CROSS-REFERENCE TO RELATED APPLICATION

This application claims the benefit of Chinese Patent Application No. 202110282699.5 filed on Mar. 16, 2021, the whole disclosure of which is incorporated herein by reference.

TECHNICAL FIELD

The present disclosure relates to a field of a computer technology, and in particular to natural language processing and deep learning technologies.

BACKGROUND

In an application field of a text matching, such as a matching of resume and job, a resume information and a job description information are generally analyzed manually, and a degree of matching between a resume and a job is generally determined according to personal experience, which is inefficient and personally subjective.

SUMMARY

The present disclosure provides a method, apparatus, device, storage medium and program product of performing a text matching.

According to an aspect of the present disclosure, there is provided a method of performing a text matching, including: determining a word set and a plurality of semantic units from a text set, the word set is associated with a first predetermined attribute, the plurality of semantic units are used for determining a pointwise mutual information between words in the word set, the text set contains a plurality of first texts indicating an object information and a plurality of second texts indicating an object demand information, and a matching relationship between the plurality of first texts and the plurality of second texts is pre-marked; generating a graph based on the text set, the plurality of semantic units and the word set, a weight of an edge between a text node and a word node in the graph is generated based on a term frequency-inverse document frequency of a word represented by the word node with respect to the text set and a text represented by the text node, and a weight of an edge between two word nodes in the graph is generated based on a pointwise mutual information of two words represented by the two word nodes with respect to the plurality of semantic units; and generating a final feature representation associated with the text set and the word set based on the graph and a graph convolution model, so as to perform the text matching.

According to another aspect of the present disclosure, there is provided an electronic device, including: at least one processor; and a memory communicatively connected to the at least one processor, the memory stores instructions executable by the at least one processor, and the instructions, when executed by the at least one processor, cause the at least one processor to implement the method described according to the first aspect.

According to another aspect of the present disclosure, there is provided a non-transitory computer-readable storage medium having computer instructions stored thereon, the computer instructions allow a computer to implement the method described according to the first aspect.

It should be understood that content described in this section is not intended to identify critical or important features in the embodiments of the present disclosure, nor is it intended to limit the scope of the present disclosure. Other features of the present disclosure may be easily understood through the following description.

BRIEF DESCRIPTION OF THE DRAWINGS

The drawings are used to understand the solution better and do not constitute a limitation to the present disclosure.

DETAILED DESCRIPTION OF EMBODIMENTS

The following describes exemplary embodiments of the present disclosure with reference to the drawings, which include various details of the embodiments of the present disclosure to facilitate understanding, and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

As described above, manually matching documents, such as manually matching a personnel resume and a job is inefficient and personally subjective. In an existing scheme, a resume text and a job description text may be represented by textCNN (text convolutional neural network), but textCNN is difficult to capture a co-occurrence information of global words and a relationship between a text and a word, so that a semantic expression of a feature representation is not accurate.

Exemplary embodiments of the present disclosure propose a solution of performing a text matching. In this solution, a computing device may determine a word set and a plurality of semantic units from a text set. The word set is associated with a first predetermined attribute, and the plurality of semantic units are used for determining a pointwise mutual information between words in the word set. The text set may contain a plurality of first texts indicating an object information and a plurality of second texts indicating an object demand information, and a matching relationship between the plurality of first texts and the plurality of second texts is pre-marked. Then, the computing device may generate a graph based on the text set, the plurality of semantic units and the word set. A weight of an edge between a text node and a word node in the graph is generated based on a term frequency-inverse document frequency of a word represented by the word node with respect to the text set and a text represented by the text node, and a weight of an edge between two word nodes in the graph is generated based on a pointwise mutual information of two words represented by the two word nodes with respect to the plurality of semantic units. Next, the computing device may generate a final feature representation associated with the text set and the word set based on the graph and a graph convolution model, so as to perform the text matching. In this way, the co-occurrence information of global words and the relationship between the text and the word may be captured, so that the text feature representation may have a more accurate semantic expression.

Hereinafter, specific embodiments of the present disclosure will be described in more detail with reference to the drawings.

Figure 1:
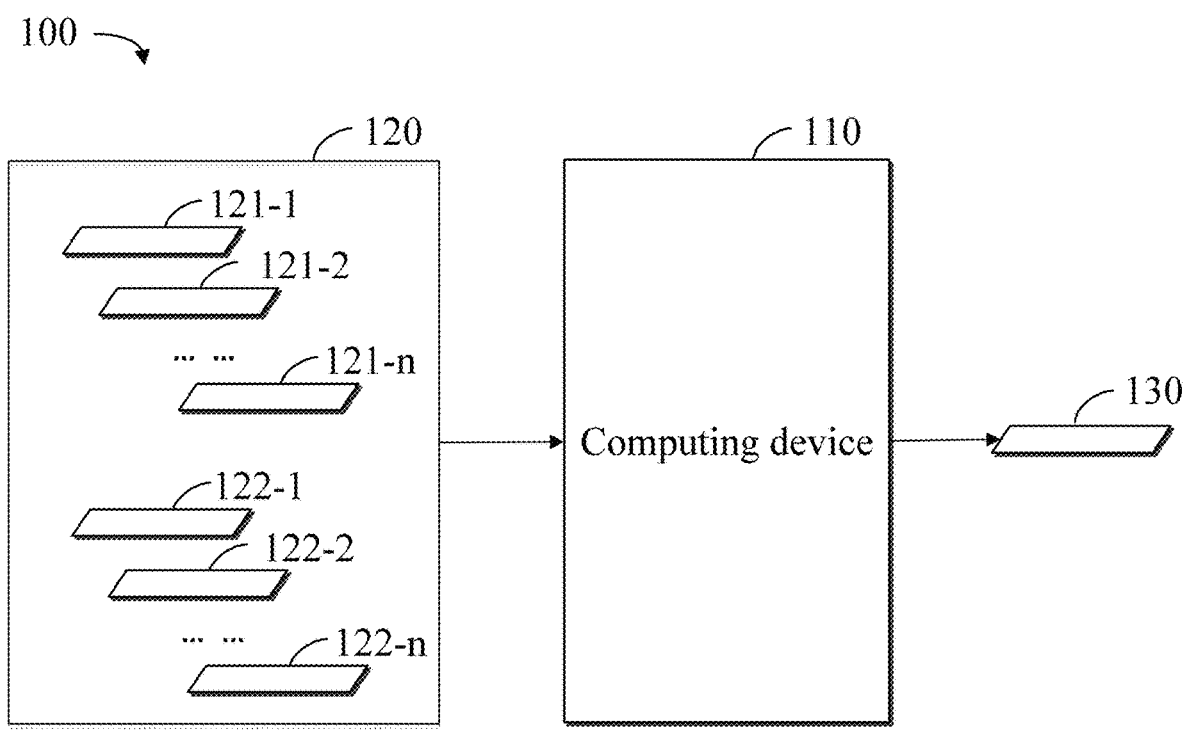
FIG. 1 shows a schematic diagram of an information processing environment 100 according to some embodiments of the present disclosure.

FIG. 1 shows a schematic diagram of an example of an information processing environment 100 according to some embodiments of the present disclosure. The information processing environment 100 may include a computing device 110, a text set 120, and a final feature representation 130.

The computing device 110 includes, for example, but is not limited to, a server computer, a multiprocessor system, a mainframe computer, a distributed computing environment including any of the above systems or devices, and the like. In some embodiments, the computing device 110 may have one or more processing units, including a dedicated processing unit such as a graphic processing unit GPU, a field programmable gate array FPGA and an application specific integrated circuit ASIC, and a general-purpose processing unit such as a central processing unit CPU.

The text set 120 may contain a plurality of first texts 121-1 to 121-n (hereinafter collectively referred to as first text 121) indicating the object information and a plurality of second texts 122-1 to 122-n (hereinafter collectively referred to as second text 122) indicating the object demand information. A matching relationship between the plurality of first texts 121 and the plurality of second texts 122 is pre-marked. For example, a first text 121 may be pre-marked to match or mismatch one or more second texts 122. The first text and the second text in the text set 120 may contain a word associated with the first predetermined attribute. For example, in a scenario of a resume and a job description, the word associated with the first predetermined attribute may include, but is not limited to a word associated with skills.

The computing device 110 may determine a word set and a plurality of semantic units from the text set 120. The word set is associated with the first predetermined attribute, and the plurality of semantic units are used for determining a pointwise mutual information between words in the word set. The text set 120 may contain the plurality of first texts 121 indicating the object information and the plurality of second texts 122 indicating the object demand information, and a matching relationship between the plurality of first texts 121 and the plurality of second texts 122 is pre-marked. The computing device 110 may generate a graph based on the text set 120, the plurality of semantic units and the word set. A weight of an edge between a text node and a word node in the graph is generated based on a term frequency-inverse document frequency of a word represented by the word node with respect to the text set and a text represented by the text node. A weight of an edge between two word nodes in the graph is generated based on a pointwise mutual information of two words represented by the two word nodes with respect to the plurality of semantic units. Furthermore, the computing device 110 may generate a final feature representation 130 associated with the text set 120 and the word set based on the graph and a graph convolution model, so as to perform the text matching.

In this way, the co-occurrence information of global words and the relationship between the text and the word may be captured, so that the text feature representation may have a more accurate semantic expression.

Figure 2:
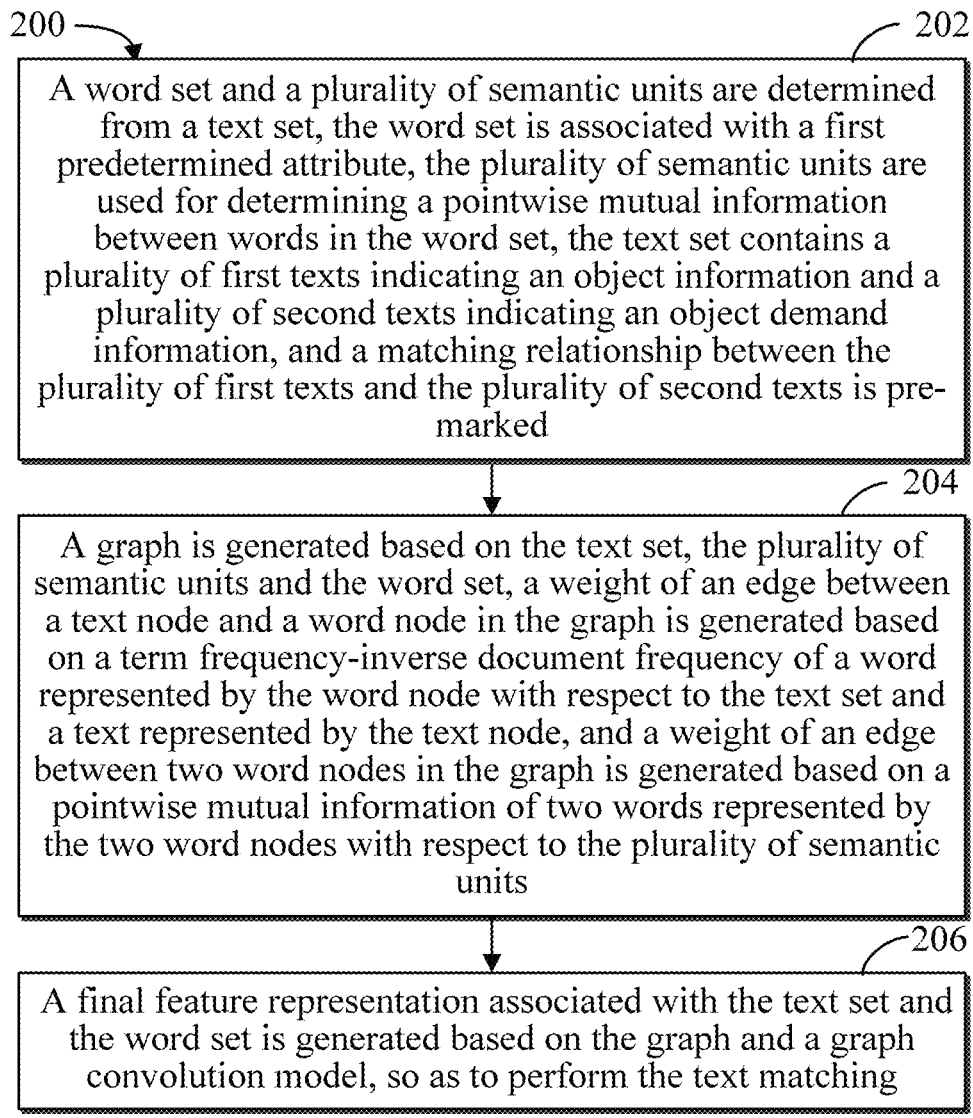
FIG. 2 shows a schematic diagram of a method 200 of performing a text matching according to some embodiments of the present disclosure.

FIG. 2 shows a flowchart of a method 200 of performing a text matching according to some embodiments of the present disclosure. For example, the method 200 may be implemented by the computing device 110 shown in FIG. 1. It should be understood that the method 200 may further include additional blocks not shown and/or blocks shown may be omitted, and the scope of the present disclosure is not limited in this respect.

In block 202, the computing device 110 determines a word set and a plurality of semantic units from the text set 120, the word set is associated with the first predetermined attribute, and the plurality of semantic units are used for determining a pointwise mutual information between words in the word set. The text set 120 may contain the plurality of first texts 121 indicating the object information and the plurality of second texts 122 indicating the object demand information, and a matching relationship between the plurality of first texts 121 and the plurality of second texts 122 is pre-marked.

For example, in the application field of a resume and a job description, the first text 121 may be a resume text, and the second text 122 may be a job description text. The first predetermined attribute includes, for example, but is not limited to a skill. The computing device 110 may determine a word set associated with the skill from a plurality of resume texts and a plurality of job description texts. It should be noted that the resume text in the embodiment may be acquired from a public dataset. It should be understood that although the application field of personal resume and job description is illustrated by way of example, the scope of the present disclosure is not limited here, and the present disclosure may also be applied to other text matching fields.

In some embodiments, the computing device 110 may determine a text segment associated with a second predetermined attribute in the first text 121 as a semantic unit. For example, in the application field of resume and job description, the second predetermined attribute includes, but is not limited to, work experience. The computing device 110 may determine a text segment used to describe a work experience in the resume text as a semantic unit.

Alternatively or additionally, in some embodiments, the computing device 110 may determine an object demand information segment in the second text 122 as a semantic unit. For example, in the application field of resume and job description, the computing device 110 may determine a sentence or a paragraph of a demand description in the job description text as a semantic unit.

Alternatively or additionally, in some embodiments, the computing device 110 may determine a text segment associated with the second predetermined attribute in the first text 121 and the object demand information segment in the second text 122 pre-marked to match the first text 121, as the same semantic unit. For example, in the application field of personal resume and job description, if a resume text is pre-marked to match a job description text, the computing device 110 may determine a text segment used to describe a work experience in the resume text and a demand description portion in the job description text as the same semantic unit.

In this way, the semantic unit for statistics of word co-occurrence may be determined, which is convenient to capture a global-word co-occurrence information.

In block 204, the computing device 110 generates a graph based on the text set 120, the plurality of semantic units and the word set. A weight of an edge between a text node and a word node in the graph is generated based on a term frequency-inverse document frequency of a word represented by the word node with respect to the text set and a text represented by the text node, and a weight of an edge between two word nodes in the graph is generated based on a pointwise mutual information of two words represented by the two word nodes with respect to the plurality of semantic units.

Figure 7:
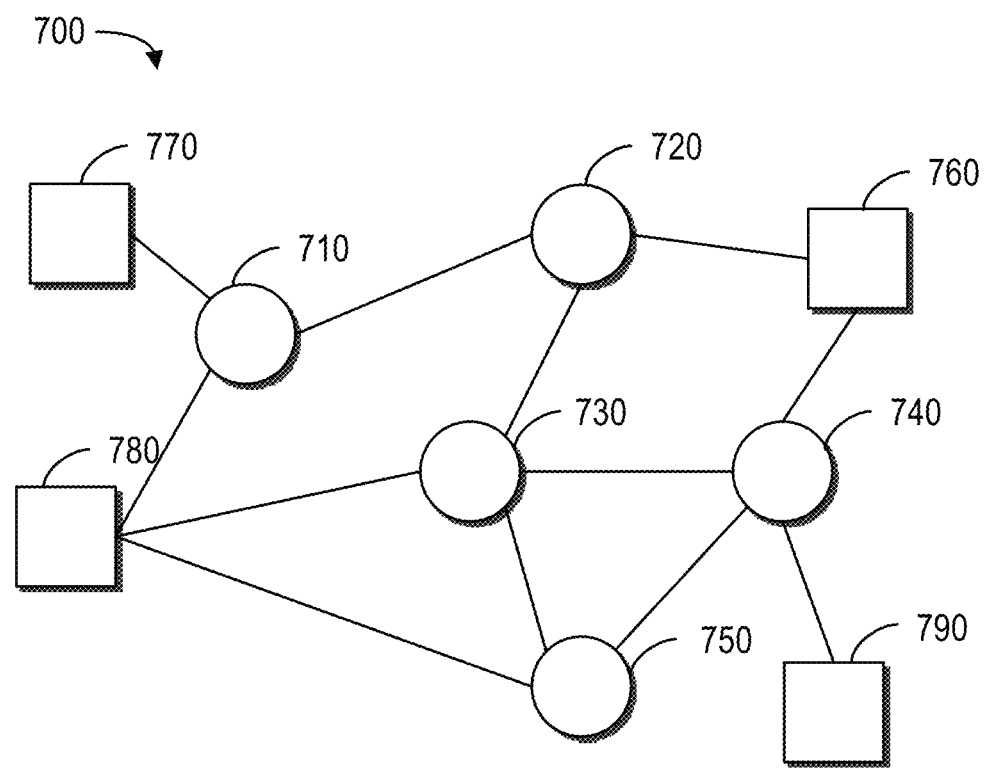
FIG. 7 shows a schematic diagram of a graph 700 according to some embodiments of the present disclosure.

An example of the graph generated is shown in FIG. 7, in which circular nodes 710 to 750 represent word nodes, and square nodes 760 to 790 represent text nodes. It should be understood that FIG. 7 is only an example, and the nodes and the edges between the nodes in the graph generated are not limited to those shown in FIG. 7. A method of generating the graph will be described in detail below in connection with FIG. 3 and FIG. 4.

Continuing with the description of FIG. 2, in block 206, the computing device 110 generates a final feature representation 130 associated with the text set and the word set based on the graph and a graph convolution model, so as to perform the text matching. A method of generating the final feature representation 130 will be described in detail below in connection with FIG. 5.

In this way, the embodiments of the present disclosure may be implemented to capture the co-occurrence information of global words and the relationship between the text and the word, so that the text feature representation may have a more accurate semantic expression. In addition, in order to eliminate an interference of other information, and consider only a skill information in the resume text and the job description text for representation, a hierarchical relationship between skill words may be accurately captured by a graph convolution model. In addition, the graph convolution model may flexibly define an optimization target for different scenario or requirement, so as to obtain the feature representation more in line with the scenario or requirement.

Figure 3:
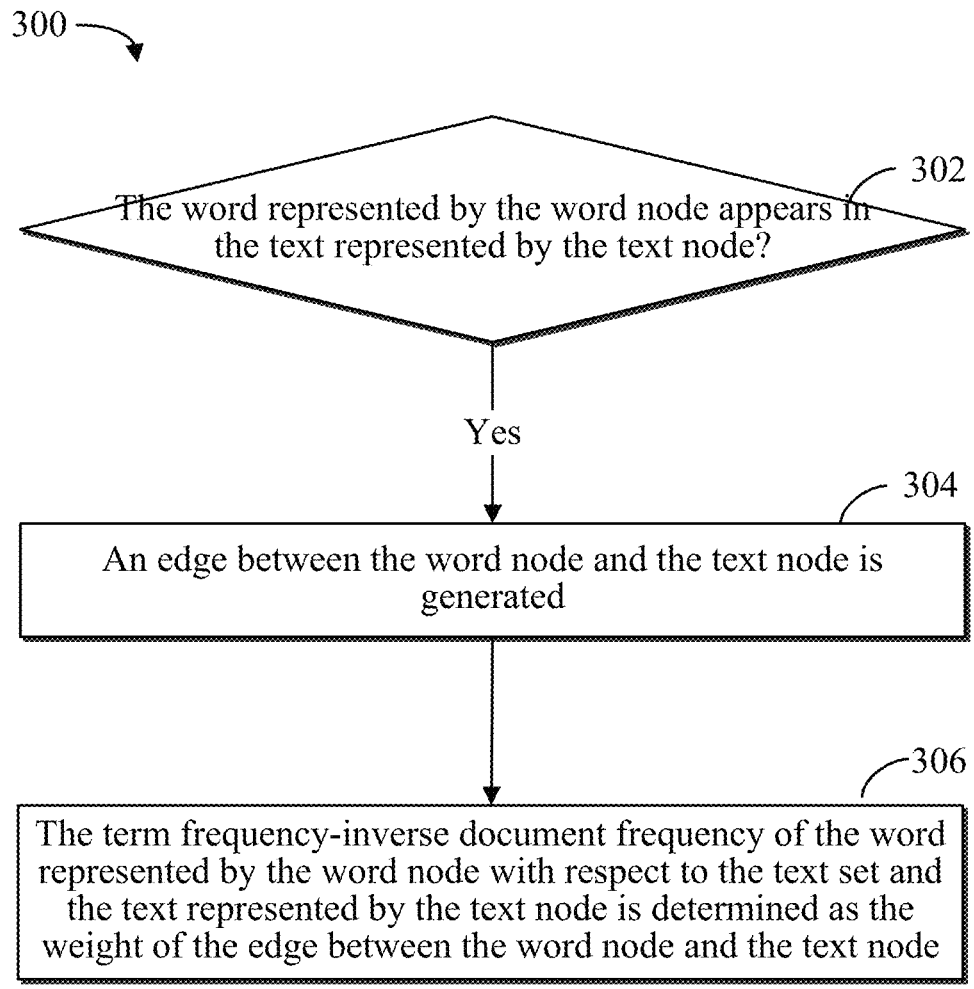
FIG. 3 shows a flowchart of a method 300 of generating a graph according to some embodiments of the present disclosure.

FIG. 3 shows a flowchart of a method 300 of generating the graph according to some embodiments of the present disclosure. For example, the method 300 may be implemented by the computing device 110 shown in FIG. 1. It should be understood that the method 300 may further include additional blocks not shown and/or blocks shown may be omitted, and the scope of the present disclosure is not limited in this respect.

In block 302, the computing device 110 determines whether the word represented by the word node appears in the text represented by the text node or not.

If the computing device 110 determines in block 302 that the word represented by the word node appears in the text represented by the text node, an edge between the word node and the text node is generated in block 304.

In block 306, the computing device 110 determines the term frequency-inverse document frequency of the word represented by the word node with respect to the text set 120 and the text represented by the text node, as the weight of the edge between the word node and the text node.

Specifically, the computing device 110 may determine a number of times the word represented by the word node appears in the text represented by the text node as a term frequency, determine a number of texts containing the word in the text set 120, and determine an inverse document frequency based on the number of texts and a total number of texts in the text set 120, so as to determine the term frequency-inverse document frequency (TF-IDF).

In this way, the relationship between the text in the text set and the word in the word set may be captured, which is convenient to generate a feature representation having a more accurate semantic expression.

Figure 4:
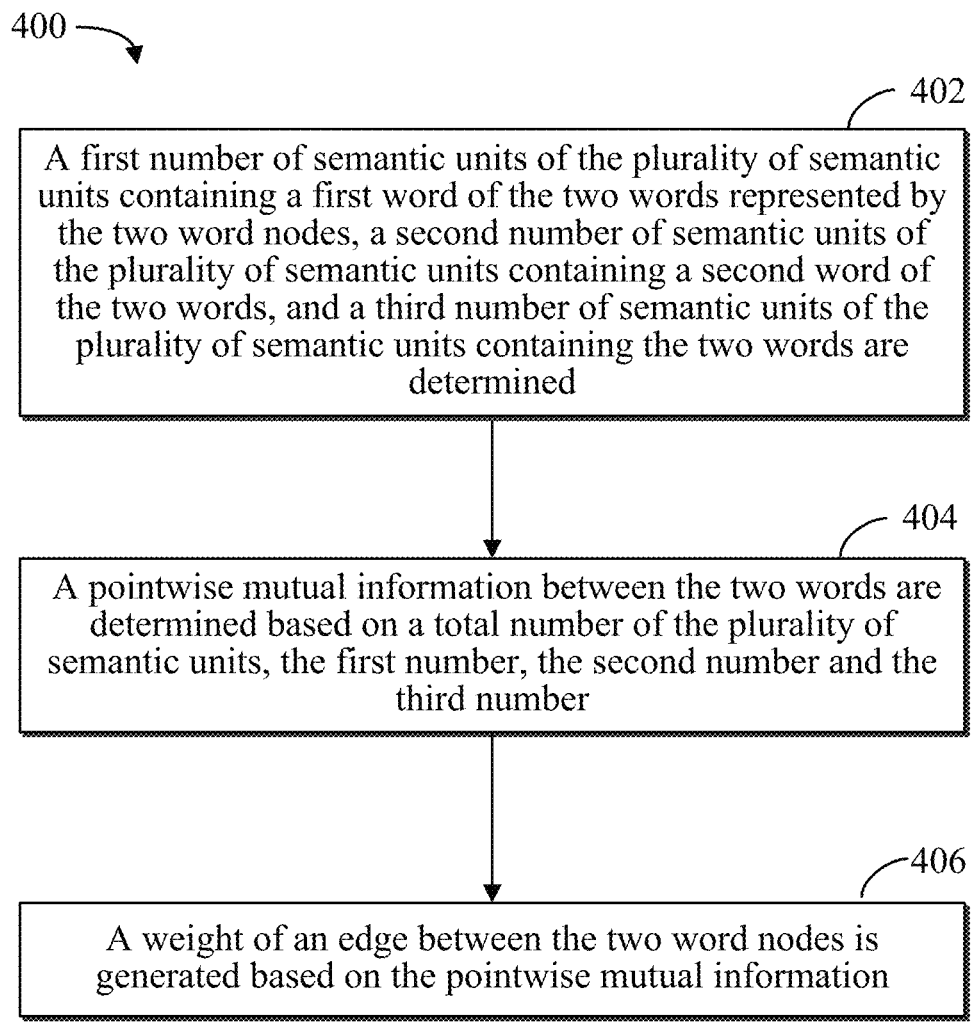
FIG. 4 shows a flowchart of a method 400 of generating a graph according to some embodiments of the present disclosure.

FIG. 4 shows a flowchart of a method 400 of generating the graph according to some embodiments of the present disclosure. For example, the method 400 may be implemented by the computing device 110 shown in FIG. 1. It should be understood that the method 400 may further include additional blocks not shown and/or blocks shown may be omitted, and the scope of the present disclosure is not limited in this respect.

In block 402, the computing device 110 determines a first number of semantic units of the plurality of semantic units containing a first word of the two words represented by the two word nodes, a second number of semantic units of the plurality of semantic units containing a second word of the two words, and a third number of semantic units of the plurality of semantic units containing both the two words.

In block 404, the computing device 110 determines a pointwise mutual information between the two words based on a total number of the plurality of semantic units, the first number, the second number and the third number.

For example, the pointwise mutual information between word i and word j may be determined by Equation 1 to Equation 4.

$$PMI(i, j) = \log\frac{p(i, j)}{p(i)p(j)} \quad \text{Equation 1}$$

$$p(i, j) = \frac{\#W(i, j)}{\#W} \quad \text{Equation 2}$$

$$p(i) = \frac{\#W(i)}{\#W} \quad \text{Equation 3}$$

$$p(i) = \frac{\#W(i)}{\#W} \quad \text{Equation 4}$$

where #W represents a total number of the plurality of semantic units, #W(i) represents a first number of semantic units containing the word i, #W(j) represents a second number of semantic units containing the word j, and #W(i,j) represents a third number of semantic units containing both the word i and the word j.

In block 406, the computing device 110 generates a weight of an edge between the two word nodes based on the pointwise mutual information. For example, the computing device 110 may determine the pointwise mutual information between the two words as the weight of the edge between the two word nodes.

In some embodiments, the computing device 110 may determine whether the pointwise mutual information between the two words is greater than zero or not. If the computing device 110 determines that the pointwise mutual information is greater than zero, the edge between the two word nodes is generated, and the pointwise mutual information between the two words is determined as the weight of the edge between the two word nodes. Since a positive pointwise mutual information indicates a high semantic correlation between the two words, and a negative pointwise mutual information indicates a low semantic correlation between the two words or an absence of a semantic correlation between the two words, it is beneficial to capture the words with a high semantic correlation by generating an edge between two word nodes with the positive pointwise mutual information.

In this way, the global co-occurrence information of the two words with respect to the plurality of semantic units in the text set may be captured, which is convenient to generate a feature representation having a more accurate semantic expression.

Figure 5:
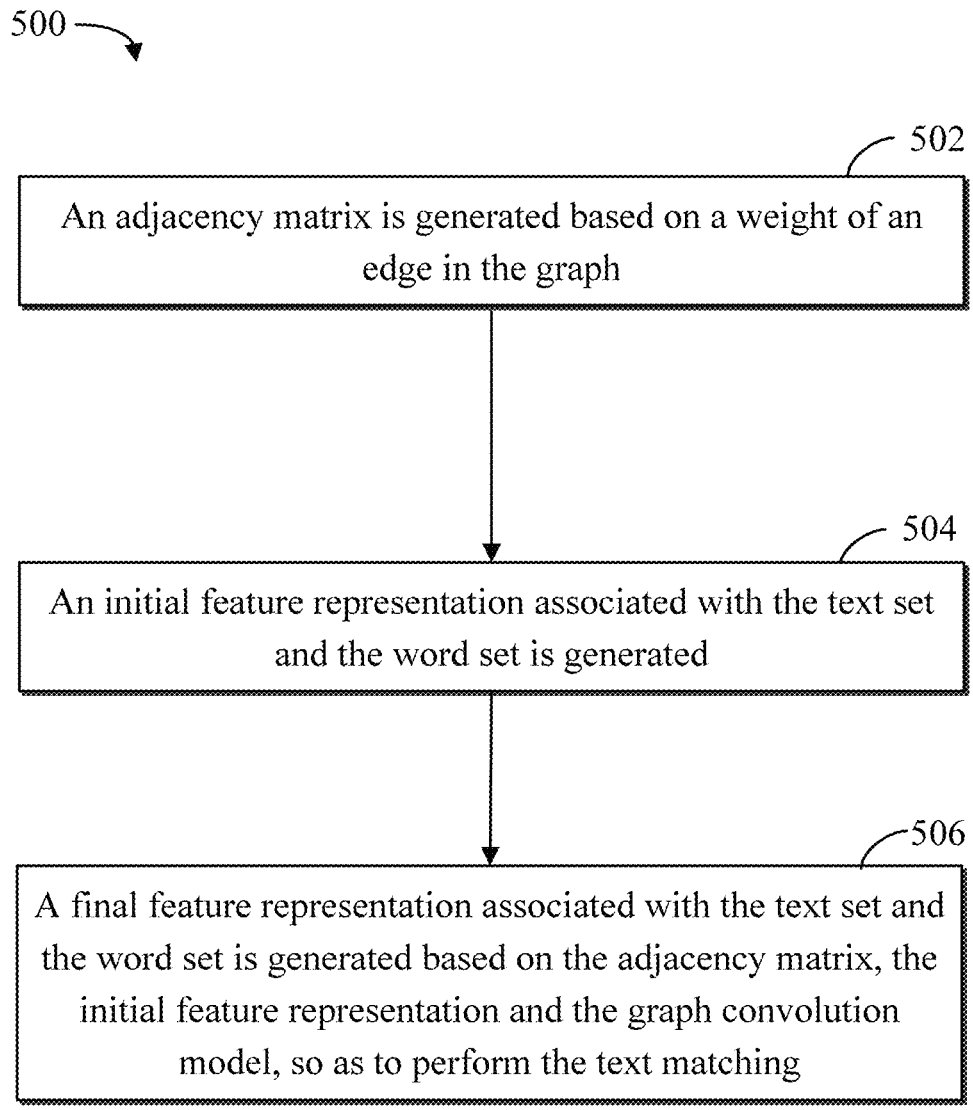
FIG. 5 shows a flowchart of a method 500 of generating a final feature representation according to some embodiments of the present disclosure.

FIG. 5 shows a flowchart of a method 500 of generating a final feature representation according to some embodiments of the present disclosure. For example, the method 500 may be implemented by the computing device 110 shown in FIG. 1. It should be understood that the method 500 may further include additional blocks not shown and/or blocks shown may be omitted, and the scope of the present disclosure is not limited in this respect.

In block 502, the computing device 110 generates an adjacency matrix based on a weight of an edge in the graph.

For example, an element $A_{ij}$ in an adjacency matrix A may be represented by Equation 5.

$$A_{ij} = \begin{cases} PMI(i,j) & i, j \text{ are words, } PMI(i,j) > 0 \\ TFIDF_{ij} & i \text{ is a text, } j \text{ is a word} \\ 1 & i = j \\ 0 & \text{others} \end{cases} \quad \text{Equation 5}$$

In block 504, the computing device 110 generates an initial feature representation associated with the text set and the word set.

For example, the computing device 110 may generate a plurality of first word representations for the plurality of first texts, a plurality of second word representations for the plurality of second texts, and a plurality of third word representations for the word set, respectively, and stitch the plurality of first word representations, the plurality of second word representations and the plurality of third word representations so as to generate the initial feature representation.

In block 506, the computing device 110 generates a final feature representation associated with the text set 120 and the word set based on the adjacency matrix, the initial feature representation and the graph convolution model, so as to perform the text matching.

For example, a two-layer graph convolution model may be used, which may be represented by Equation 6.

$$Z = \text{Softmax}\left(\tilde{A}\text{ReLU}\left(\tilde{A}XW_0\right)W_1\right) \quad \text{Equation 6}$$

where X represents the initial feature representation, $W_0$ and $W_1$ represent model parameters, Z represents the final feature representation, $$\tilde{A} = D^{-\frac{1}{2}}AD^{-\frac{1}{2}},$$

represents a degree matrix of the adjacency matrix A, $D_{ij}=\Sigma_j A_{ij}$. In a first layer, ReLU may be used as an activation function, and in a second layer, softmax is used to normalize an output.

In this way, a hierarchical relationship between the word sets associated with the first predetermined attribute may be captured through the graph convolution model, which is convenient for generating a text feature representation having a more accurate semantic expression.

In some embodiments, an objective function in the graph convolution model may be optimized, so that the objective function is used to maximize a feature similarity between the first text and the second text pre-marked as match in the text set 120 and minimize a feature similarity between the first text and the second text pre-marked as mismatch in the text set 120. The feature similarity includes, for example, but is not limited to, cosine similarity, or dot product.

Specifically, the computing device 110 may generate an intermediate feature representation associated with the text set and the word set based on the adjacency matrix, the initial feature representation and the graph convolution model.

Next, the computing device 110 may update the graph convolution model by a gradient descent based on the intermediate feature representation and the objective function. The objective function is used to maximize a feature similarity between the first text and the second text pre-marked as match in the text set and minimize a feature similarity between the first text and the second text pre-marked as mismatch in the text set.

The above two steps are repeatedly performed until a convergence of a gradient of the objective function is achieved, and the intermediate feature representation corresponding to the convergence is determined as the final feature representation.

As an example, the objective function may be achieved by Equation 7.

$$\min\left(-\sum_{i=1}^{|M|} \cos(j_i, r_i) + \sum_{f=1}^{|F|} \cos(j_f, r_f)\right) \quad \text{Equation 7}$$

where M represents a set of the first text and the second text pre-marked as match in the text set 120, i represents an i-th pair of matching first and second texts in the set, F represents a set of the first text and the second text pre-marked as mismatch in the text set 120, f represents an f-th pair of mismatching first and second texts in the set, r represents the first text, and j represents the second text. For example, in the application field of personal resume and job description, M represents a set of a resume text and a job description text pre-marked as match in the text set 120, i represents an i-th pair of matching resume text and job description text in the set, F represents a set of a resume text and a job description text pre-marked as mismatch in the text set 120, f represents an f-th pair of mismatching resume text and job description text in the set, r represents the resume text, and j represents the job description text.

In this way, the embodiments of the present disclosure may be implemented to enable the final feature representation generated by the graph convolution model to satisfy that the cosine similarity corresponding to the matching first text and second text is maximized and the cosine similarity corresponding to the mismatching first text and second text is minimized, so as to solve the problem in an existing automatic document matching scheme that a negative sample may not be used for modeling, and that a custom optimization target may not be used which may cause a lack of flexibility.

Figure 6:
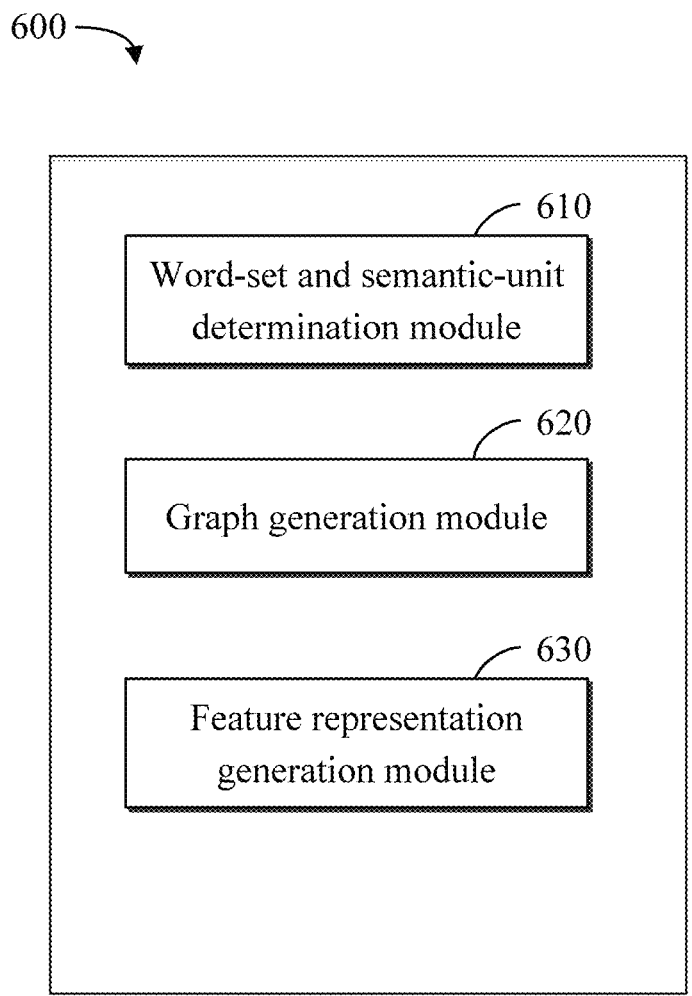
FIG. 6 shows a schematic diagram of an apparatus 600 of performing a text matching according to some embodiments of the present disclosure.

FIG. 6 shows a schematic diagram of an apparatus 600 of performing a text matching according to some embodiments of the present disclosure. As shown in FIG. 6, the apparatus 600 includes a word-set and semantic-unit determination module 610, a graph generation module 620, and a feature representation generation module 630.

The word-set and semantic-unit determination module 610 is used to determine a word set and a plurality of semantic units from a text set 120. The word set is associated with a first predetermined attribute, and the plurality of semantic units are used for determining a pointwise mutual information between words in the word set. The text set 120 may contain a plurality of first texts indicating an object information and a plurality of second texts indicating an object demand information, and a matching relationship between the plurality of first texts and the plurality of second texts is pre-marked.

The graph generation module 620 is used to generate a graph based on the text set 120, the plurality of semantic units and the word set. A weight of an edge between a text node and a word node in the graph is generated based on a term frequency-inverse document frequency of a word represented by the word node with respect to the text set and a text represented by the text node. A weight of an edge between two word nodes in the graph is generated based on a pointwise mutual information of two words represented by the two word nodes with respect to the plurality of semantic units.

The feature representation generation module 630 is used to generate a final feature representation associated with the text set 120 and the word set based on the graph and a graph convolution model, so as to perform the text matching.

In this way, the co-occurrence information of global words and the relationship between the text and the word may be captured, so that the text feature representation may have a more accurate semantic expression In some embodiments, the word-set and semantic-unit determination module 610 is further used to perform at least one of: determining a text segment associated with a second predetermined attribute in the first text and an object demand information segment in a second text as the same semantic unit, the second text is pre-marked to match the first text; determining the text segment associated with the second predetermined attribute in the first text as a semantic unit; and determining the object demand information segment in the second text as a semantic unit.

Alternatively or additionally, in some embodiments, the graph generation module 620 is further used to: if it is determined that the word represented by the word node appears in the text represented by the text node, then generate the edge between the word node and the text node; and determine the term frequency-inverse document frequency of the word represented by the word node with respect to the text set and the text represented by the text node as the weight of the edge between the word node and the text node.

Alternatively or additionally, in some embodiments, the graph generation module 620 includes: a semantic-unit-number determination sub-module used to determine a first number of semantic units of the plurality of semantic units containing a first word of the two words represented by the two word nodes, a second number of semantic units of the plurality of semantic units containing a second word of the two words, and a third number of semantic units of the plurality of semantic units containing the two words; a pointwise-mutual-information determination sub-module used to determine a pointwise mutual information between the two words based on a total number of the plurality of semantic units, the first number, the second number and the third number; and a weight generation sub-module used to generate the weight of the edge between the two word nodes based on the pointwise mutual information.

Alternatively or additionally, in some embodiments, the weight generation sub-module is further used to: if it is determined that the pointwise mutual information is greater than zero, then generate the edge between the two word nodes; and determine the pointwise mutual information as the weight of the edge between the two word nodes.

Alternatively or additionally, in some embodiments, the feature representation generation module 630 includes: an adjacency matrix generation sub-module used to generate an adjacency matrix based on a weight of an edge in the graph; an initial-feature-representation generation sub-module used to generate an initial feature representation associated with the text set and the word set; and a final-feature-representation generation sub-module used to generate the final feature representation associated with the text set and the word set based on the adjacency matrix, the initial feature representation and the graph convolution model, so as to perform the text matching.

Alternatively or additionally, in some embodiments, the final-feature-representation generation sub-module is further used to: perform step S1 of generating an intermediate feature representation associated with the text set and the word set based on the adjacency matrix, the initial feature representation and the graph convolution model; perform step S2 of updating the graph convolution model by a gradient descent based on the intermediate feature representation and an objective function, the objective function is configured to maximize a feature similarity between the first text and the second text pre-marked as match in the text set and minimize a feature similarity between the first text and the second text pre-marked as mismatch in the text set; and repeatedly perform step S1 and step S2 until a convergence of a gradient of the objective function is achieved, and determine the intermediate feature representation corresponding to the convergence as the final feature representation.

In some embodiments, the first text is a resume text, and the second text is a job description text.

In the technical solution of the present disclosure, the collection, storage, use, processing, transmission, provision, and disclosure of the user's personal information involved are in compliance with relevant laws and regulations, and do not violate public order and good customs.

According to the embodiments of the present disclosure, the present disclosure further provides an electronic device, a readable storage medium, and a computer program product.

Figure 8:
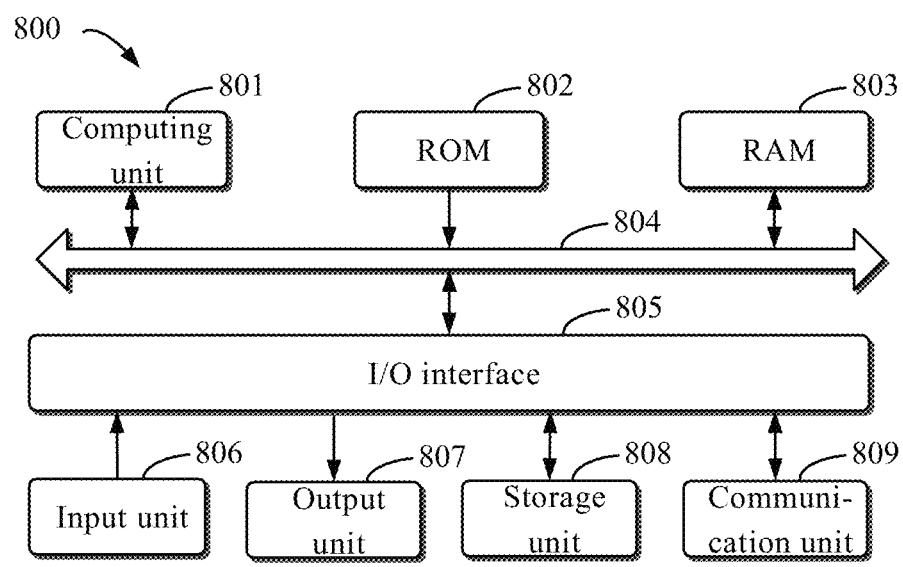
FIG. 8 shows a block diagram of an electronic device for implementing the method of performing the text matching according to some embodiments of the present disclosure.

FIG. 8 shows a schematic block diagram of an exemplary electronic device 800 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 800 includes a computing unit 801, which may perform various appropriate actions and processing based on a computer program stored in a read-only memory (ROM) 802 or a computer program loaded from a storage unit 808 into a random access memory (RAM) 803. Various programs and data required for the operation of the electronic device 800 may be stored in the RAM 803. The computing unit 801, the ROM 802 and the RAM 803 are connected to each other through a bus 804. An input/output (I/O) interface 805 is also connected to the bus 804.

Various components in the electronic device 800, including an input unit 806 such as a keyboard, a mouse, etc., an output unit 807 such as various types of displays, speakers, etc., a storage unit 808 such as a magnetic disk, an optical disk, etc., and a communication unit 809 such as a network card, a modem, a wireless communication transceiver, etc., are connected to the I/O interface 805. The communication unit 809 allows the electronic device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 801 may perform the various methods and processes described above, such as the methods 200 to 500. For example, in some embodiments, the methods 200 to 500 may be implemented as a computer software program that is tangibly contained on a machine-readable medium, such as the storage unit 808. In some embodiments, part or all of a computer program may be loaded and/or installed on electronic device 800 via the ROM 802 and/or the communication unit 809. When the computer program is loaded into the RAM 803 and executed by the computing unit 801, one or more steps of the methods 200 to 500 described above may be performed. Alternatively, in other embodiments, the computing unit 801 may be configured to perform the methods 200 to 500 in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server can be a cloud server, a distributed system server, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of performing a text matching, comprising:
   determining a word set and a plurality of semantic units from a text set, wherein the word set is associated with a first predetermined attribute, the plurality of semantic units are used for determining a pointwise mutual information between words in the word set, the text set contains a plurality of first texts indicating an object information and a plurality of second texts indicating an object demand information, and a matching relationship between the plurality of first texts and the plurality of second texts is pre-marked;
   generating a graph based on the text set, the plurality of semantic units and the word set, wherein a weight of an edge between a text node and a word node in the graph is generated based on a term frequency-inverse document frequency of a word represented by the word node with respect to the text set and a text represented by the text node, and a weight of an edge between two word nodes in the graph is generated based on a pointwise mutual information of two words represented by the two word nodes with respect to the plurality of semantic units; and
   generating a final feature representation associated with the text set and the word set based on the graph and a graph convolution model, so as to perform the text matching.

2. The method of claim 1, wherein the determining a plurality of semantic units comprises at least one of:
   determining a text segment associated with a second predetermined attribute in the first text and an object demand information segment in a second text as the same semantic unit, wherein the second text is pre-marked to match the first text;
   determining the text segment associated with the second predetermined attribute in the first text as a semantic unit; and
   determining the object demand information segment in the second text as a semantic unit.

3. The method of claim 1, wherein the generating a graph comprises:
   in response to determining that the word represented by the word node appears in the text represented by the text node,
      generating the edge between the word node and the text node; and
      determining the term frequency-inverse document frequency of the word represented by the word node with respect to the text set and the text represented by the text node as the weight of the edge between the word node and the text node.

4. The method of claim 1, wherein the generating a graph comprises:
   determining a first number of semantic units of the plurality of semantic units containing a first word of the two words represented by the two word nodes, a second number of semantic units of the plurality of semantic units containing a second word of the two words, and a third number of semantic units of the plurality of semantic units containing the two words;
   determining a pointwise mutual information between the two words based on a total number of the plurality of semantic units, the first number, the second number and the third number; and
   generating the weight of the edge between the two word nodes based on the pointwise mutual information.

5. The method of claim 4, wherein the generating the weight of the edge between the two word nodes comprises:
   in response to determining that the pointwise mutual information is greater than zero,
      generating the edge between the two word nodes; and
      determining the pointwise mutual information as the weight of the edge between the two word nodes.

6. The method of claim 1, wherein the generating a final feature representation comprises:
   generating an adjacency matrix based on a weight of an edge in the graph;
   generating an initial feature representation associated with the text set and the word set; and
   generating the final feature representation associated with the text set and the word set based on the adjacency matrix, the initial feature representation and the graph convolution model, so as to perform the text matching.

7. The method of claim 6, wherein the generating the final feature representation comprises:
   step S1 of generating an intermediate feature representation associated with the text set and the word set based on the adjacency matrix, the initial feature representation and the graph convolution model;
   step S2 of updating the graph convolution model by a gradient descent based on the intermediate feature representation and an objective function, wherein the objective function is configured to maximize a feature similarity between the first text and the second text pre-marked as match in the text set and minimize a feature similarity between the first text and the second text pre-marked as mismatch in the text set; and
   repeatedly performing step S1 and step S2 until a convergence of a gradient of the objective function is achieved, and determining the intermediate feature representation corresponding to the convergence as the final feature representation.

8. The method of claim 1, wherein the first text is a resume text, and the second text is a job description text.

9. An electronic device, comprising:
   at least one processor; and
   a memory communicatively connected to the at least one processor, wherein the memory stores instructions executable by the at least one processor, and the instructions, when executed by the at least one processor, cause the at least one processor to implement operations of performing a text matching, comprising:
   determining a word set and a plurality of semantic units from a text set, wherein the word set is associated with a first predetermined attribute, the plurality of semantic units are used for determining a pointwise mutual information between words in the word set, the text set contains a plurality of first texts indicating an object information and a plurality of second texts indicating an object demand information, and a matching relationship between the plurality of first texts and the plurality of second texts is pre-marked;

generating a graph based on the text set, the plurality of semantic units and the word set, wherein a weight of an edge between a text node and a word node in the graph is generated based on a term frequency-inverse document frequency of a word represented by the word node with respect to the text set and a text represented by the text node, and a weight of an edge between two word nodes in the graph is generated based on a pointwise mutual information of two words represented by the two word nodes with respect to the plurality of semantic units; and generating a final feature representation associated with the text set and the word set based on the graph and a graph convolution model, so as to perform the text matching.

10. The electronic device of claim 9, wherein the determining a plurality of semantic units comprises at least one of:

determining a text segment associated with a second predetermined attribute in the first text and an object demand information segment in a second text as the same semantic unit, wherein the second text is pre-marked to match the first text;

determining the text segment associated with the second predetermined attribute in the first text as a semantic unit; and determining the object demand information segment in the second text as a semantic unit.

11. The electronic device of claim 9, wherein the generating a graph comprises:

in response to determining that the word represented by the word node appears in the text represented by the text node, generating the edge between the word node and the text node; and determining the term frequency-inverse document frequency of the word represented by the word node with respect to the text set and the text represented by the text node as the weight of the edge between the word node and the text node.

12. The electronic device of claim 9, wherein the generating a graph comprises:

determining a first number of semantic units of the plurality of semantic units containing a first word of the two words represented by the two word nodes, a second number of semantic units of the plurality of semantic units containing a second word of the two words, and a third number of semantic units of the plurality of semantic units containing the two words;

determining a pointwise mutual information between the two words based on a total number of the plurality of semantic units, the first number, the second number and the third number; and generating the weight of the edge between the two word nodes based on the pointwise mutual information.

13. The electronic device of claim 12, wherein the generating the weight of the edge between the two word nodes comprises:

in response to determining that the pointwise mutual information is greater than zero, generating the edge between the two word nodes; and determining the pointwise mutual information as the weight of the edge between the two word nodes.

14. The electronic device of claim 9, wherein the generating a final feature representation comprises:

generating an adjacency matrix based on a weight of an edge in the graph;

generating an initial feature representation associated with the text set and the word set; and generating the final feature representation associated with the text set and the word set based on the adjacency matrix, the initial feature representation and the graph convolution model, so as to perform the text matching.

15. The electronic device of claim 14, wherein the generating the final feature representation comprises:

step S1 of generating an intermediate feature representation associated with the text set and the word set based on the adjacency matrix, the initial feature representation and the graph convolution model;

step S2 of updating the graph convolution model by a gradient descent based on the intermediate feature representation and an objective function, wherein the objective function is configured to maximize a feature similarity between the first text and the second text pre-marked as match in the text set and minimize a feature similarity between the first text and the second text pre-marked as mismatch in the text set; and repeatedly performing step S1 and step S2 until a convergence of a gradient of the objective function is achieved, and determining the intermediate feature representation corresponding to the convergence as the final feature representation.

16. The electronic device of claim 9, wherein the first text is a resume text, and the second text is a job description text.

17. A non-transitory computer-readable storage medium having computer instructions stored thereon, wherein the computer instructions allow a computer to implement operations of performing a text matching, comprising:

determining a word set and a plurality of semantic units from a text set, wherein the word set is associated with a first predetermined attribute, the plurality of semantic units are used for determining a pointwise mutual information between words in the word set, the text set contains a plurality of first texts indicating an object information and a plurality of second texts indicating an object demand information, and a matching relationship between the plurality of first texts and the plurality of second texts is pre-marked;

generating a graph based on the text set, the plurality of semantic units and the word set, wherein a weight of an edge between a text node and a word node in the graph is generated based on a term frequency-inverse document frequency of a word represented by the word node with respect to the text set and a text represented by the text node, and a weight of an edge between two word nodes in the graph is generated based on a pointwise mutual information of two words represented by the two word nodes with respect to the plurality of semantic units; and generating a final feature representation associated with the text set and the word set based on the graph and a graph convolution model, so as to perform the text matching.

18. The non-transitory computer-readable storage medium of claim 17, wherein the determining a plurality of semantic units comprises at least one of:

determining a text segment associated with a second predetermined attribute in the first text and an object demand information segment in a second text as the same semantic unit, wherein the second text is pre-marked to match the first text;

determining the text segment associated with the second predetermined attribute in the first text as a semantic unit; and determining the object demand information segment in the second text as a semantic unit.

19. The non-transitory computer-readable storage medium of claim 17, wherein the generating a graph comprises:

in response to determining that the word represented by the word node appears in the text represented by the text node, generating the edge between the word node and the text node; and determining the term frequency-inverse document frequency of the word represented by the word node with respect to the text set and the text represented by the text node as the weight of the edge between the word node and the text node.

20. The non-transitory computer-readable storage medium of claim 17, wherein the generating a graph comprises:

determining a first number of semantic units of the plurality of semantic units containing a first word of the two words represented by the two word nodes, a second number of semantic units of the plurality of semantic units containing a second word of the two words, and a third number of semantic units of the plurality of semantic units containing the two words;

determining a pointwise mutual information between the two words based on a total number of the plurality of semantic units, the first number, the second number and the third number; and generating the weight of the edge between the two word nodes based on the pointwise mutual information.

\* \* \* \* \*